United States Patent
Niimura et al.

(10) Patent No.: US 11,573,142 B2
(45) Date of Patent: Feb. 7, 2023

(54) CAPACITIVE DIAPHRAGM VACUUM GAUGE INCLUDING A PRESSURE SENSOR WITH MULTIPLE RECESSES BEING FORMED IN THE DIAPHRAGM

(71) Applicant: AZBIL CORPORATION, Tokyo (JP)

(72) Inventors: Yusuke Niimura, Chiyoda-ku (JP); Takuya Ishihara, Chiyoda-ku (JP); Masaru Soeda, Chiyoda-ku (JP); Masashi Sekine, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 67 days.

(21) Appl. No.: 17/178,636

(22) Filed: Feb. 18, 2021

(65) Prior Publication Data
US 2021/0255048 A1 Aug. 19, 2021

(30) Foreign Application Priority Data
Feb. 19, 2020 (JP) .............................. JP2020-026189

(51) Int. Cl.
*G01L 9/00* (2006.01)
(52) U.S. Cl.
CPC .................. *G01L 9/0047* (2013.01)
(58) Field of Classification Search
None
See application file for complete search history.

(56) References Cited

U.S. PATENT DOCUMENTS

| | | | |
|---|---|---|---|
| 5,507,090 A * | 4/1996 | Shipley | G01L 1/2287 29/411 |
| 5,542,300 A * | 8/1996 | Lee | G01L 9/0072 73/718 |
| 6,443,015 B1 | 9/2002 | Poulin et al. | |
| 6,591,687 B1 * | 7/2003 | Bjoerkman | G01L 9/0075 73/718 |
| 7,765,874 B2 | 8/2010 | Wuest | |
| 8,123,963 B2 * | 2/2012 | Benzel | G01L 9/0042 216/2 |
| 8,656,787 B2 | 2/2014 | Ishihara et al. | |
| 9,228,913 B2 | 1/2016 | Ishihara et al. | |
| 10,107,315 B2 | 10/2018 | Gu et al. | |
| 2009/0158853 A1 * | 6/2009 | Berner | G01L 19/147 356/480 |
| 2010/0186516 A1 * | 7/2010 | Hanselmann | G01L 9/0075 73/718 |
| 2014/0150559 A1 | 6/2014 | Ishihara et al. | |

(Continued)

FOREIGN PATENT DOCUMENTS

| | | | | |
|---|---|---|---|---|
| JP | 2007328916 A | * | 12/2007 | ............. H01B 1/122 |
| JP | 2008-107214 A | | 5/2008 | |
| JP | 2009-524024 A | | 6/2009 | |

(Continued)

*Primary Examiner* — Peter J Macchiarolo
*Assistant Examiner* — Jermaine L Jenkins
(74) *Attorney, Agent, or Firm* — Oblon, McClelland, Maier & Neustadt, L.L.P.

(57) ABSTRACT

A pressure sensor includes a diaphragm of a thin plate shape, the diaphragm forming part of a wall surface of a pressure chamber into and out from which a measurement target fluid flows. Multiple recesses are formed in the diaphragm on a side in contact with the measurement target fluid, and an interval between adjacent two of the multiple recesses is 10 μm or less.

8 Claims, 8 Drawing Sheets

(56) References Cited

U.S. PATENT DOCUMENTS

2015/0040674 A1    2/2015  Ishihara et al.
2018/0238756 A1*  8/2018  Ishihara ................ G01L 9/0072

FOREIGN PATENT DOCUMENTS

| | | | | |
|---|---|---|---|---|
| JP | 2009-265041 A | 11/2009 | | |
| JP | 2010-236949 A | 10/2010 | | |
| JP | 2011-149946 A | 8/2011 | | |
| JP | 2014-109484 A | 6/2014 | | |
| JP | 2014-126504 A | 7/2014 | | |
| JP | 2015-34786 A | 2/2015 | | |
| JP | 6096380 B | 3/2017 | | |
| JP | 2020030066 A | * | 2/2020 | ............. G01L 7/082 |

* cited by examiner 0.5 μm

CAPACITIVE DIAPHRAGM VACUUM GAUGE INCLUDING A PRESSURE SENSOR WITH MULTIPLE RECESSES BEING FORMED IN THE DIAPHRAGM

CROSS-REFERENCE TO RELATED APPLICATIONS

The present application is based on and claims priority to Japanese Application No. 2020-026189, filed Feb. 19, 2020, the entire contents of which are incorporated herein by reference.

BACKGROUND

1. Field of the Disclosure

The present disclosure relates to a pressure sensor including a diaphragm in contact with a measurement target fluid.

2. Description of the Related Art

A semiconductor manufacturing apparatus is known as a typical apparatus utilizing a capacitive diaphragm vacuum gauge. Main reasons why the diaphragm vacuum gauge is used in the semiconductor manufacturing apparatus are as follows. Unlike a thermal vacuum gauge such as a Pirani gauge or an ionization vacuum gauge, the diaphragm vacuum gauge is not dependent on the type of gas, has corrosion resistance to corrosive process gases, and can suppress adsorption of material gases and deposition of byproducts and so on by heating a sensor.

The diaphragm vacuum gauge is used in various steps carried out in the semiconductor manufacturing apparatus, such as not only in a film forming step, but also in a step of etching wafers of Si or the like. For example, sputtering, CVD (chemical vapor deposition), and ALD (atomic layer deposition) are known as film forming methods that are carried out in the film forming step.

If a film forming substance is deposited on a diaphragm of the diaphragm vacuum gauge for measuring and controlling pressure of process gas in the film forming step, the film forming substance forms a deposited film while causing continuous chemical reactions and sticks to a pressure receiving surface of the diaphragm with relatively strong force. In that film forming step accompanying with the continuous chemical reactions, force acting between molecules or between crystal lattices, namely the so-called film internal stress, generates. The film internal stress strongly acts on the diaphragm to which the deposited film has stuck (more specifically, causes bending moment to act on the diaphragm), thereby deforming the diaphragm. The deformation of the diaphragm due to the bending moment caused by the film internal stress gives rise to a shift of the zero point or a change in pressure sensitivity. This significantly affects quality in the film formation and the etching.

Aiming to prevent the above-described deposition of the byproducts to the diaphragm vacuum gauge, various methods of holding a sensor chip including the diaphragm at high temperature, and of disposing baffles in a path through which the process gas flows toward the diaphragm, thus forming the path in a complicated labyrinth shape and capturing easily-adhering gases midway the path, have been conceived and put into practice (Patent Document 1: Japanese Unexamined Patent Application Publication No. 2011-149946, Patent Document 2: Japanese Patent No. 6096380, and Patent Document 3: Japanese Unexamined Patent Application Publication No. 2015-34786). Furthermore, aiming to control a gas inflow path in combination with the baffles, there have been proposed structures in which a gas inlet for guiding the process gas to the diaphragm is disposed at a position slightly closer to an outer peripheral portion of the diaphragm instead of a region near a center of the diaphragm where the deposition causes a large influence (Patent Document 1, Patent Document 2, Patent Document 4: Japanese Unexamined Patent Application Publication No. 2014-126504, and Patent Document 5: Japanese Unexamined Patent Application Publication No. 2014-109484).

Regarding a process of forming a uniform film based on physical and chemical adsorption to a surface as in the ALD, a diaphragm structure in which moment is adjusted to suppress flexure of the diaphragm itself has been proposed as disclosed in Patent Document 6: Japanese Unexamined Patent Application Publication No. 2010-236949 and Patent Document 7: Japanese Unexamined Patent Application Publication No. 2009-265041.

On the other hand, Patent Document 8: Japanese Unexamined Patent Application Publication (Translation of PCT Application) No. 2009-524024 and Patent Document 9: Japanese Unexamined Patent Application Publication No. 2008-107214 propose structures as an attempt of suppressing the influence of the deposited film with structural features of the diaphragm in the diaphragm vacuum gauge. Those Patent Documents 8 and 9 describe methods of disposing table-shaped, inverse-tapered, or rectangular waveform-like structural bodies on the diaphragm, and of forming a honeycomb-shaped beam structure on the diaphragm, thereby dividing the deposited film and suppressing the influence of the film internal stress upon the diaphragm.

The technique disclosed in Patent Documents 8 and 9, namely the technique of dividing (splitting) the deposited film formed on the surface of the diaphragm and eliminating the influence of the deposited film (deformation of the diaphragm) (the structure used in this technique is called the "film division structure" hereinafter), is expected to be effective, but further improvements of the structural form, verification of the effect, and so on are still demanded from the technical point of view. For example, the structural form capable of more satisfactorily dividing (splitting) the deposited film is demanded. It is further demanded to clarify a specific condition necessary to realize the desired effect with the film division structure, and to study a feasible form (for example, practically processable form) that can satisfy the specific condition.

SUMMARY

In view of the above-described situations in the art, a main object of the present disclosure is to provide a pressure sensor with the film division structure capable of satisfactorily suppressing an influence upon a diaphragm (deformation of the diaphragm) caused by the internal stress in a deposited film. Preferably, the present disclosure provides a pressure sensor in which the film division structure is constituted to be practically formable (for example, processable).

To achieve the above-mentioned object, the present disclosure provides a pressure sensor including a diaphragm that has a thin plate shape and that forms part of a wall surface of a pressure chamber into and out from which a measurement target fluid flows, wherein multiple recesses are formed in the diaphragm on a side in contact with the measurement target fluid, and an interval between adjacent two of the multiple recesses is 10 μm or less.

In the above-described pressure sensor, the diaphragm may be coated with a porous layer including holes that constitute the recesses and that are formed on a side in contact with the measurement target fluid, and a diameter of the holes may be 10 μm or less.

In the above-described pressure sensor, the porous layer may be made of sapphire or α-phase aluminum oxide.

In the above-described pressure sensor, the recesses may be each formed such that a width of an opening formed on the side in contact with the measurement target fluid is smaller than a maximum width of an inner space.

In the above-described pressure sensor, the recesses may be each formed as a linear groove defined by a substantially cylindrical wall surface.

In the above-described pressure sensor, the recesses may be each formed as a hole defined by a substantially spherical wall surface.

In the above-described pressure sensor, the opening width of the recesses may be smaller than a depth of the recesses.

In addition, a capacitive diaphragm vacuum gauge may be constituted using the above-described pressure sensor.

According to the present disclosure, the pressure sensor capable of satisfactorily suppressing the influence upon the diaphragm (deformation of the diaphragm) caused by the internal stress in a deposited film can be obtained. Furthermore, as a preferable advantageous effect of the present disclosure, the pressure sensor constituted to be able to form the film division structure therein (by, for example, processing) can be obtained.

DETAILED DESCRIPTION

Figure 1:
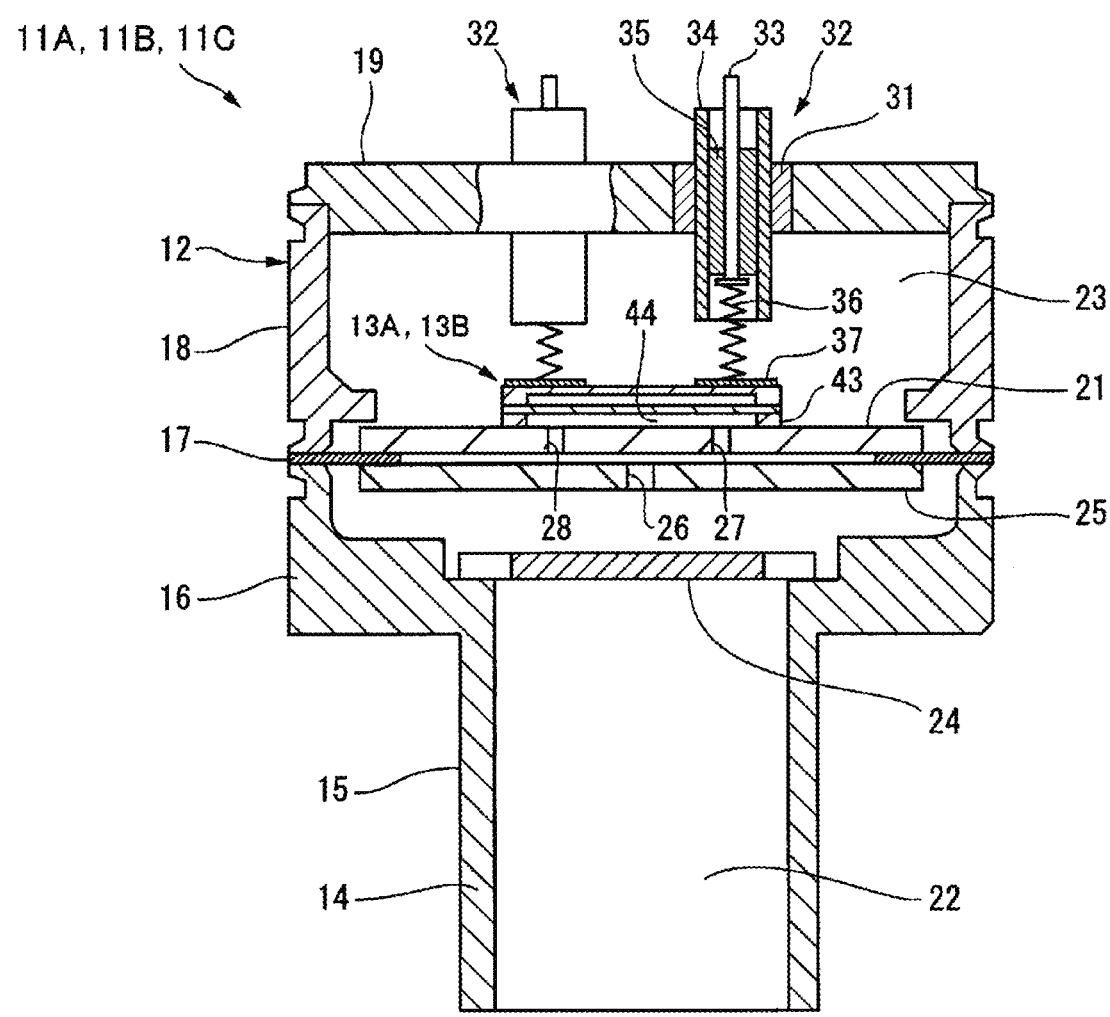
FIG. 1 is a sectional view of a capacitive diaphragm vacuum gauge including a pressure sensor according to an embodiment of the present disclosure.
Figure 2:
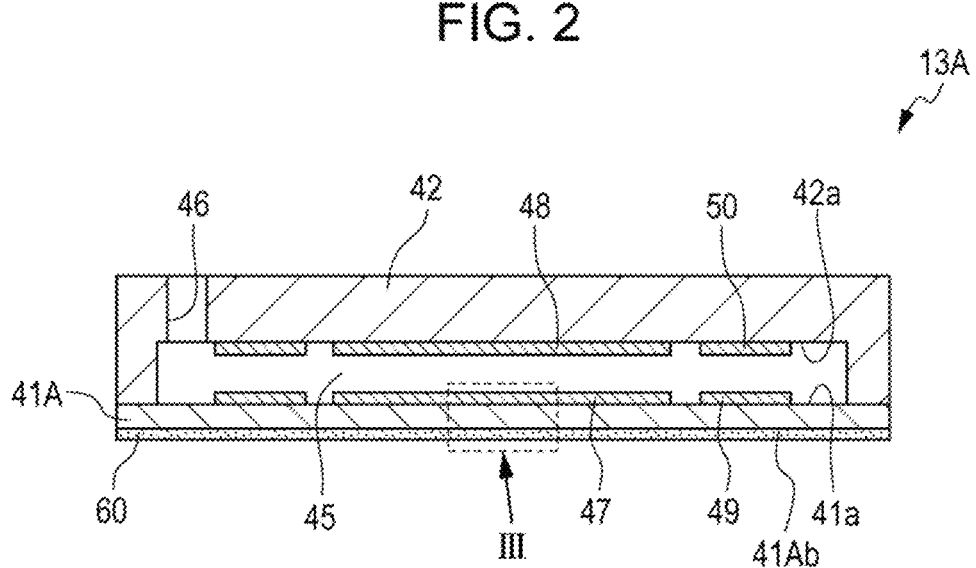
FIG. 2 is a sectional view of the pressure sensor according to the embodiment of the present disclosure.
Figure 3:
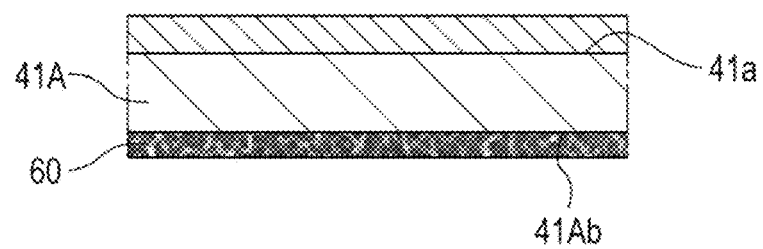
FIG. 3 is an enlarged sectional view of a portion III in FIG. 2.

Preferred embodiments of the present disclosure will be described below as first to third embodiments with reference to FIGS. 1 to 10. Constituent elements common to the embodiments are denoted by the same reference signs and repeated description of those constituent elements is omitted. A front-rear direction, a left-right direction, and an up-down direction in the following description are defined, unless otherwise specified, as a depth direction, a left-right direction, and an up-down direction, respectively, with respect to a drawing sheet of FIG. 1 illustrating a capacitive diaphragm vacuum gauge 11A (11B) and/or drawing sheets of FIGS. 2 and 6 illustrating a sensor chip 13A and a sensor chip 13B, respectively. It is to be noted that each drawing is a conceptual view and illustrated details are not always in match with those of an actual pressure sensor.

First Embodiment

First, to clarify a specific form providing a desired effect with the film division structure, details of verification performed by the inventors are described with reference to FIGS. 8A to 10. This verification has been performed in accordance with not only the above-described technical object of clarifying the specific condition necessary to realize the desired effect with the film division structure, but also the technical object, conceived by the inventors, of determining the feasible form (for example, the practically processable form) that can satisfy the specific condition.

Verification Related to Film Division Structure

Figure 8A:
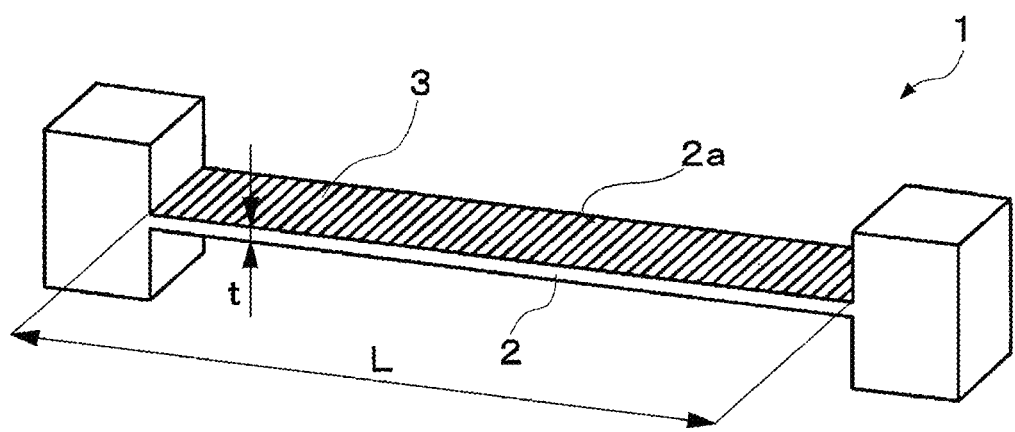
FIG. 8A is a perspective view illustrating a calculation model for a film division simulation.
Figure 8B:
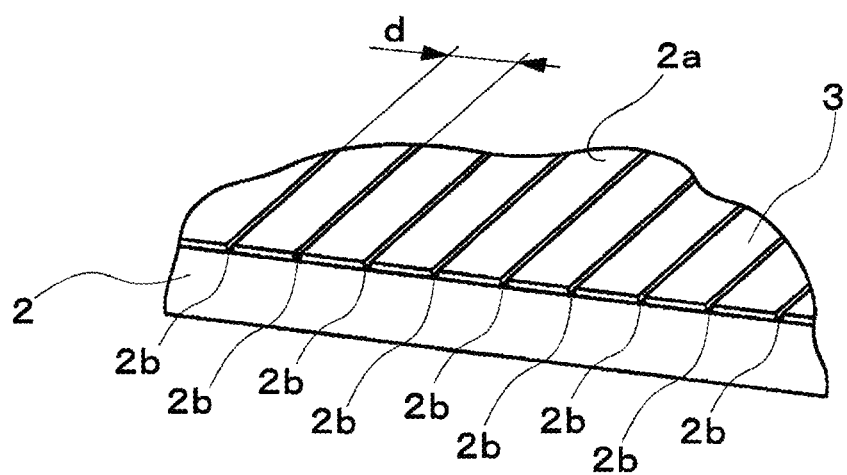
FIG. 8B is a partial enlarged view of FIG. 8A.

The verification has been conducted by performing a simulation using a finite element method (namely, a FEM analysis) on a three-dimensional model 1 constituted by a flat plate 2 fixed at both the ends, as illustrated in FIG. 8A, under a predetermined boundary condition. Although a diaphragm included in the pressure sensor according to the present disclosure is usually a disk-shaped member fixed at its periphery, the three-dimensional model 1 of the above-described structure is approximately assumed to be the diaphragm for simplification of calculations.

In consideration of s phenomenon that a deposited film 3 is formed on a surface 2a of a flat plate 2 and bending moment caused by internal stress in the deposited film 3 acts on the surface 2a to which the deposited film 3 has stuck, this simulation has been performed with attention focused on the number of divisions (splits) of the deposited film 3 and with intent to verify relation between a change in the number of divisions (splits) and a change in deformation amount of the flat plate 2. More specifically, by assuming the case in which a slit 2b (see FIG. 8B) dividing (splitting) the deposited film 3 is present or absent and by setting, as a parameter, the number n of slit(s) when one or more slits 2b are formed, the deformation amount of the flat plate 2 in individual division cases has been analyzed, and relation between the number of divisions of the deposited film 3 and the deformation amount of the flat plate 2 has been verified. Here, when the number n of slits 2b are formed, the deposited film 3 formed on the surface 2a of the flat plate 2 is divided into the number (n+1) of pieces (the number of divided pieces of the deposited film 3 is called the "division number N" hereinafter).

In the following description, the internal stress in the deposited film 3 is called the "film internal stress" in some cases. It is known that the flat plate 2 receives the bending moment caused by the film internal stress and deforms (flexes) to protrude downward when the flat plate 2 contracts, for example.

Figure 9A:
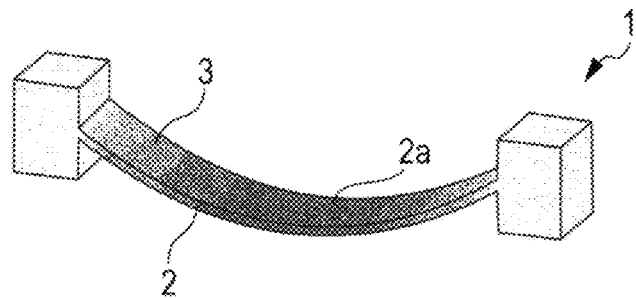
FIG. 9A is a perspective view illustrating a result of the simulation.
Figure 9B:
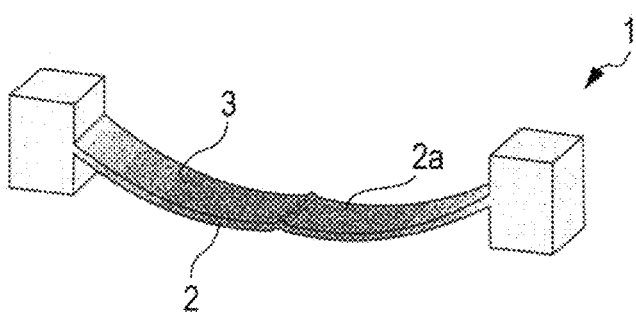
FIG. 9B is a perspective view illustrating a result of the simulation.
Figure 9C:
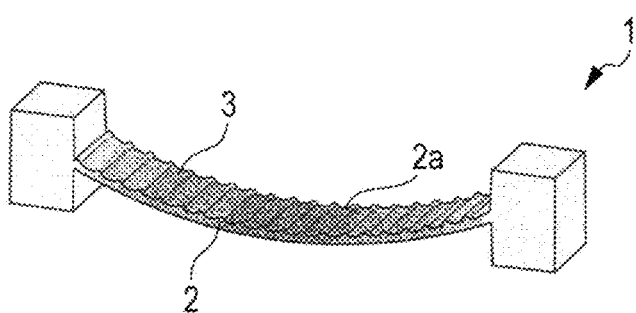
FIG. 9C is a perspective view illustrating a result of the simulation.
Figure 9D:
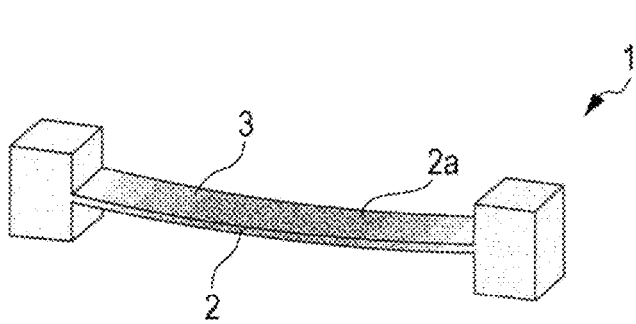
FIG. 9D is a perspective view illustrating a result of the simulation.

Examples of results of the simulations are illustrated in FIGS. 9A to 9D. In the simulations, an overall length L of the flat plate 2 is assumed to be 5000 μm and a thickness t thereof is assumed to be 200 μm. Those values are determined in accordance with the diameter and the thickness of an actual disk-shaped diaphragm. FIG. 9A illustrates a deformation mode when the slit 2b is not formed (namely, n=0 and N=1), and FIG. 9B illustrates a deformation mode when the deposited film 3 is divided into two pieces by the slit 2b (namely, n=1 and N=2). FIG. 9C illustrates a deformation mode when the deposited film 3 is divided into twenty pieces by the slits 2b (namely, n=19 and N=20), and FIG. 9D illustrates a deformation mode when the deposited film 3 is divided into two hundred pieces by the slits 2b (namely, n=199 and N=200). Scales of the deformations in FIGS. 9A to 9D are unified.

Figure 10:
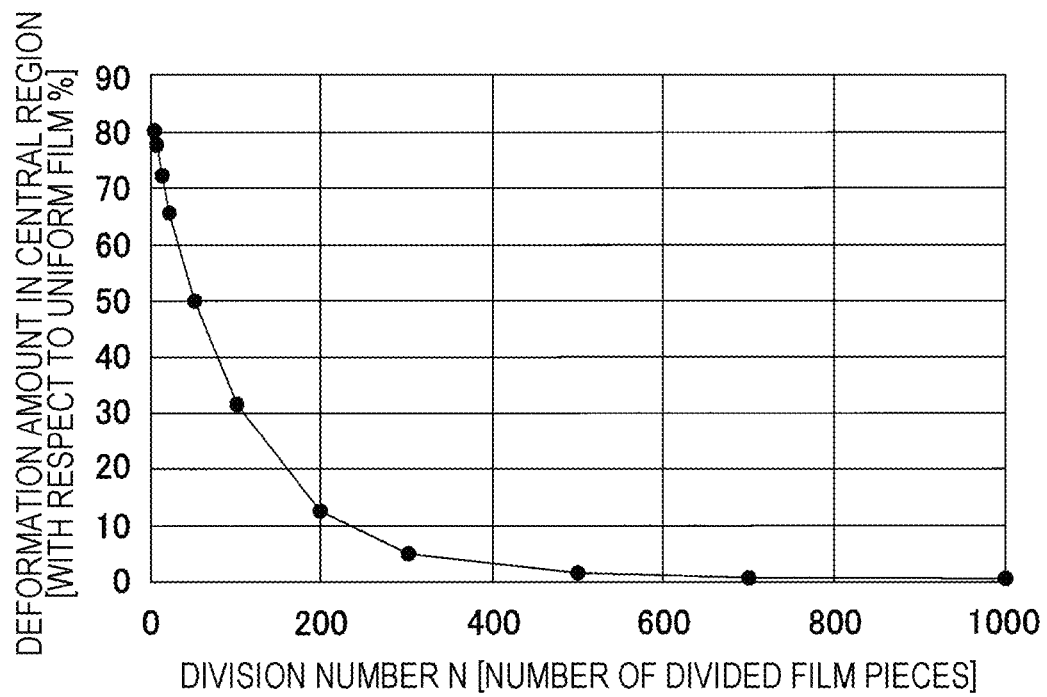
FIG. 10 is a graph plotting a result of the simulation.

FIG. 10 plots, with a horizontal axis indicating the division number N of the deposited film 3, a relative value of the deformation amount (caused by the internal stress in the deposited film 3) in the central region of the flat plate when the deformation amount in a state in which the deposited film 3 is uniformly formed without being divided (split) (the deposited film in this state is called the "uniform film" hereinafter) is assumed to be a reference (100%). As seen from the plotted result, as the deposited film 3 is divided (split) into smaller pieces, the deformation amount decreases and the effect of suppressing the influence of the bending moment caused by the film internal stress upon the diaphragm (namely, the deformation of the diaphragm) increases. Thus, it is seen that the deformation (deformation amount) of the diaphragm correlates with the division number N of the deposited film 3 and attenuates exponentially. Furthermore, it can be confirmed that dividing the deposited film 3 into 500 or more pieces is effective from the viewpoint of reducing the deformation amount to 5% or less of the uniform film.

As understood from the above-mentioned result, in order to reduce the deformation amount to 5% or less of the uniform film, the slits 2b need to be formed at intervals of 1/500 or less of a length (overall length L) specifying a maximum length of a region where the deposited film 3 is formed (namely, a maximum length of a region in contact with a measurement target fluid). As mentioned above, the overall length L (spacing between both the fixed ends) of the flat plate 2 illustrated as the calculation model in FIGS. 8A to 10 is 5000 μm. Accordingly, an interval d (d=5000/N μm) between the adjacent slits 2b in the above case is 10 μm or less.

Here, the pressure to be measured is 1000 Pa or below in many cases, and the temperature of the vacuum gauge is heated to a level from 150° C. to 200° C. A mean free path is known as an index representing a frequency of collisions between gas molecules and is dependent on a molecule radius, absolute temperature, and pressure. In the case of nitrogen molecules, for example, the mean free path is about 100 μm at 150° C. and 1000 Pa. When the size of a space in which the gas molecules are present is sufficiently smaller than the mean free path, collisions between molecules and chemical reactions caused by the collisions are suppressed. The above-mentioned value of 100 μm is in the case of nitrogen molecules and a variety of gases, such as silane and oxygen, have to be taken into consideration in practice. It is, however, deemed that chemical reactions in gas phase are suppressed for any types of gases and at any levels of temperature and pressure by setting the size of the above-mentioned space to 1/10 or less of the mean free path, and that adhesion of molecules to a wall surface is less likely to occur. From the above-described reason, the interval between the slits 2b is desirably set to be 10 μm or less.

Thus, for the purpose of suppressing the deformation (deformation amount) of the diaphragm due to the bending moment caused by the film internal stress, the inventors have focused attention on the idea of dividing (splitting) the deposited film and have found that the deformation (deformation amount) attenuates exponentially as the division number of the deposited film increases, namely that the division number of the deposited film can be regarded as an index for obtaining the effect of suppressing the deformation (deformation amount). Furthermore, the inventors have clarified that the deposited film needs to be divided into 500 or more pieces in order to obtain the desired effect of reducing the deformation amount to, for example, 5% or less of the uniform film, namely that, when the length (overall length L) specifying the maximum length of the region where the deposited film 3 is formed (namely, the maximum length of the region in contact with the measurement target fluid) is 5000 μm, the slits 2b need to be formed at intervals of 1/500 or less of the overall length L, namely 10 μm or less. Moreover, the inventors have studied, based on the fact having been clarified by the above-described unique verification, a feasible structure to obtain the desired effect (a feasible structure capable of satisfying the above-described condition necessary to provide the desired effect), and have reached the conclusion that the film division structure described later needs to be adopted.

The pressure sensor (the sensor chip 13A) according to the first embodiment of the present disclosure, which has been newly fabricated based on the above-described verification result, and the capacitive diaphragm vacuum gauge 11A including the pressure sensor (the sensor chip 13A) will be described below with reference to FIGS. 1 to 5.

Structure of Capacitive Diaphragm Vacuum Gauge 11A

First, a structure of the capacitive diaphragm vacuum gauge 11A is described. As illustrated in FIG. 1, the capacitive diaphragm vacuum gauge 11A mainly includes a package 12 positioned on an outermost side, and the sensor chip 13A placed in the package 12. Here, the sensor chip 13A corresponds to a "pressure sensor" mentioned in Claims.

The package 12 is formed in a bottom-equipped cylindrical shape by welding multiple members to each other. The multiple members constituting the package 12 are a lower package 15 positioned on a lowermost side in FIG. 1 and having a small-diameter portion 14, a cylindrical upper package 18 connected to a large-diameter portion 16 of the lower package 15 with a support diaphragm 17 (described later) interposed therebetween, a disk-shaped cover 19 closing an open end of the upper package 18.

The support diaphragm 17 is made of a corrosive metal material and is formed in an annular plate shape. An outer peripheral edge of the support diaphragm 17 is welded to the lower package 15 and the upper package 18 to be held by both the packages. An opening of the support diaphragm 17 is formed in a circular shape when viewed in a thickness direction of the support diaphragm 17 and is closed by the sensor chip 13A in a state in which the sensor chip 13A is bonded to the support diaphragm 17 with a first base plate 21 interposed therebetween. Thus, the support diaphragm 17 partitions a space within the package 12 into an inlet portion 22 and a reference vacuum chamber 23 in cooperation with the sensor chip 13A. A baffle 24 is disposed within the inlet portion 22.

The reference vacuum chamber 23 is kept at a predetermined degree of vacuum.

The first base plate 21 cooperates with a second base plate 25 to sandwich the support diaphragm 17 between the first and second base plates 21 and 25. Each of the first and second base plates 21 and 25 is made of sapphire, is formed in a circular plate shape, and is bonded to the support diaphragm 17. Communication holes 26 to 28 allowing the measurement target fluid to pass therethrough are formed in the first and second base plates 21 and 25.

Multiple electrode leads 32 are embedded in the cover 19 with hermetic seals 31 interposed therebetween. Each of the electrode leads 32 includes an electrode lead pin 33 and a metal-made shield 34. The electrode lead pin 33 is supported in the shield 34 with a hermitic seal 35 interposed therebetween. One end of the electrode lead pin 33 is exposed to the outside of the package 12 and is connected to an external signal processing portion via a wiring (not illustrated). The other end of the electrode lead pin 33 is connected to a contact pad 37 of the sensor chip 13A (described below) with a conductive contact spring 36 interposed therebetween.

The sensor chip 13A is to detect pressure in the inlet portion 22 within the package 12 based on capacitance and is supported inside the package 12 by the support diaphragm 17 and the first and second base plates 21 and 25. As illustrated in FIG. 2, the sensor chip 13A includes a diaphragm 41A positioned on a lower side and a sensor base 42 bonded to the diaphragm 41A. The diaphragm 41A is made of sapphire, is formed in a circular plate shape, and is attached to the first base plate 21 with a spacer 43 interposed therebetween, as illustrated in FIG. 1. A pressure chamber 44 into and out from which the measurement target fluid flows is formed between the diaphragm 41A and the first base plate 21. Thus, the diaphragm 41A constitutes part of walls of the pressure chamber 44.

The sensor base 42 is made of sapphire and is formed in a rectangular shape with a cylindrical recess. An opening of the recess in the sensor base 42 is closed by the diaphragm 41A. As illustrated in FIG. 2, a communication hole 46 communicating a capacitance chamber 45 inside the sensor base 42 and the reference vacuum chamber 23 outside the sensor base 42 with each other is formed in the sensor base 42. The capacitance chamber 45 and the reference vacuum chamber 23 are kept at the same degree of vacuum.

Two types of electrodes 48, 50 and 47, 49 are disposed respectively on an inner bottom surface 42a of the sensor base 42 and one surface 41a of the diaphragm 41A, the one surface 41a being opposite to the inner bottom surface 42a of the sensor base 42. More specifically, the pair of pressure sensitive electrodes 47 and 48 are disposed respectively on a central region of the diaphragm 41A and a central region of the inner bottom surface 42a of the sensor base 42. The pair of reference electrodes 49 and 50 are disposed respectively on an outer peripheral portion of the diaphragm 41A and an outer peripheral portion of the inner bottom surface 42a of the sensor base 42. The sensor chip 13A detects the pressure applied to the diaphragm 41A based on both the capacitance of a pressure sensitive capacitor constituted by the pressure sensitive electrodes 47 and 48 and the capacitance of a reference capacitor constituted by the reference electrodes 49 and 50.

Because the measurement target fluid for use in the film formation flows into and out from the pressure chamber 44, a film (not illustrated) is formed on the other surface of the diaphragm 41A, the other surface being positioned on an opposite side to the sensor base 42 and being held in contact with the measurement target fluid, (namely, on a lower surface of the diaphragm 41A in FIG. 1, this surface is called a "measurement-target-fluid contact surface 41Ab" hereinafter). The diaphragm 41A according to this embodiment has, as described below, the film division structure for reducing, to a desired level, the deformation due to the bending moment caused by the internal stress that is generated with deposition of the film. The measurement-target-fluid contact surface 41Ab is circular and has a diameter of 5000 μm, for example.

Film Division Structure

Examples of the film division structure of the diaphragm 41A will be described below with reference to FIGS. 2 to 5. The film division structure is constituted by a porous layer (cellular layer) 60 that is formed to cover the measurement-target-fluid contact surface 41Ab of the diaphragm 41A.

Figure 4:
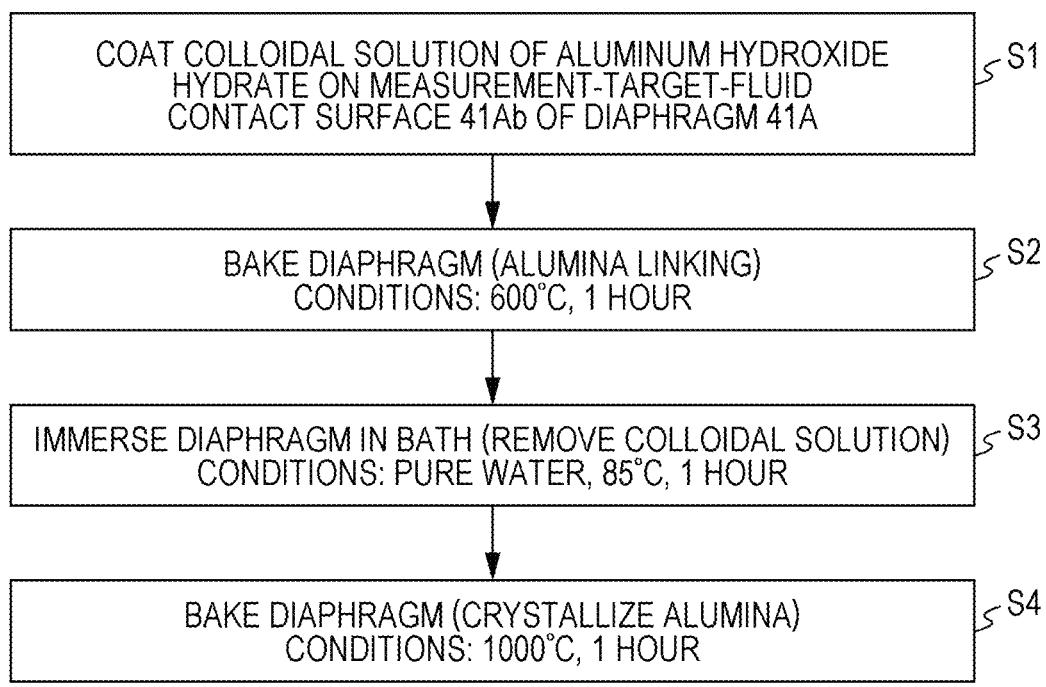
FIG. 4 is a flowchart illustrating procedures of forming a porous layer.

The porous layer 60 is formed in accordance with procedures illustrated in FIG. 4, for example.

First, a colloidal solution of aluminum hydroxide hydrate is coated over the entirety of the measurement-target-fluid contact surface 41Ab of the diaphragm 41A (step S1).

Then, the diaphragm 41A coated with the colloidal solution is baked for 1 hour at temperature of 600° C. (step S2). The baking causes alumina linking of aluminum hydroxide.

After the baking in step S2, the diaphragm 41A is immersed in a bath of pure water at 85° C. for 1 hour to remove the colloidal solution (step S3).

After step S3, the diaphragm 41A is baked again for 1 hour at temperature of 1000° C. (step S4). As a result, the alumina-linked aluminum hydroxide is crystallized and the porous layer 60 made of sapphire or α-phase aluminum oxide is formed on the measurement-target-fluid contact surface 41Ab of the diaphragm 41A.

Figure 5:
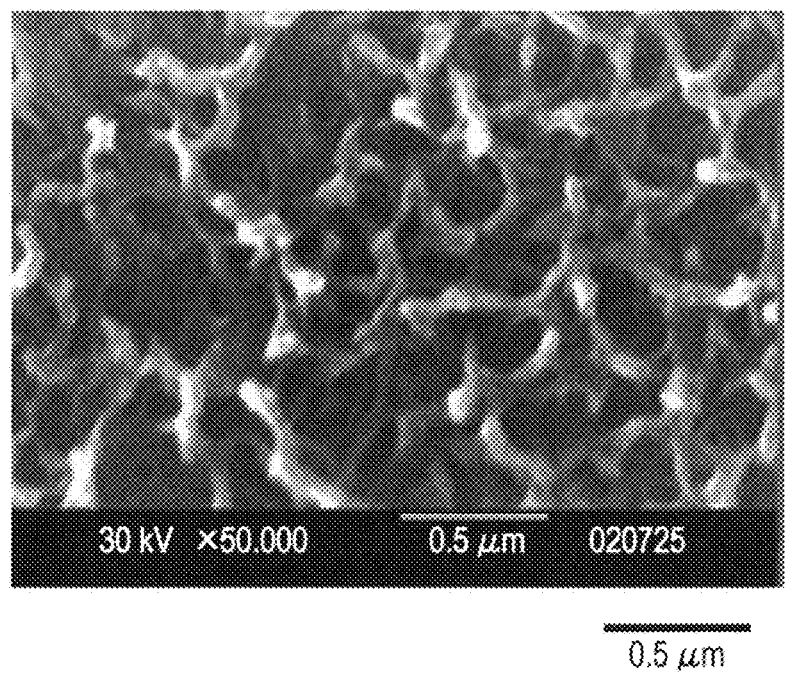
FIG. 5 is an enlarged photograph of the porous layer formed in accordance with the procedures illustrated in FIG. 4.
Figure 6:
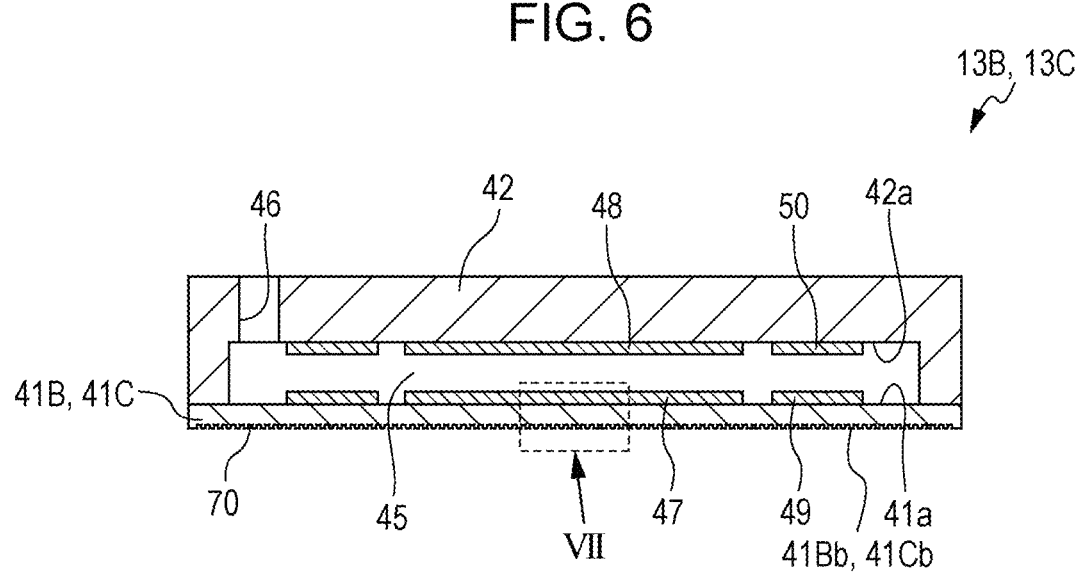
FIG. 6 is a sectional view of a pressure sensor according to another embodiment of the present disclosure.

FIG. 5 is an enlarged photograph of the porous layer 60 formed in accordance with the above-described procedures. As seen from the enlarged photograph, the porous layer 60 includes many small holes with an opening width (opening size) of 0.5 μm to 1 μm or less. Those holes are formed between regions of sapphire or α-phase aluminum oxide linked together in a mesh-like pattern and extend from a surface to a deep layer portion. Furthermore, the adjacent holes are formed to be coupled to each other like a chain. In other words, an interval between the adjacent holes, namely a width of the regions of sapphire or α-phase aluminum oxide linked together in the mesh-like pattern, is smaller than the opening size of the holes and is 0.5 μm or more and less than 1 μm. A thickness of the porous layer 60 is, for example, several ten μm. Thus, the opening width of the holes is smaller than a depth of the holes.

The porous layer 60 in the above-described form is merely one example and different types of porous layers may be formed while changing materials and formation conditions such that a diameter of the opened holes is smaller (for example, 0.1 μm) or larger (for example, 10 μm) than the above-mentioned range. The material and the formation method to be used here may be optionally selected from the known materials and methods.

Advantageous Effects

In the sensor chip 13A of the above-described structure and the capacitive diaphragm vacuum gauge 11A including the sensor chip 13A, a film forming substance contained in the measurement target fluid is deposited between the adjacent holes in the porous layer 60. In other words, the holes in the porous layer 60 formed to cover the entirety of the measurement-target-fluid contact surface 41Ab function as elements dividing (splitting) the deposited film like the slits 2b formed in the above-described simulation, thus constituting the film division structure.

As described above, the diameter of the holes formed in the porous layer 60 is 0.5 μm to 1 μm or less and the interval between the adjacent holes is smaller than the diameter of the holes and is 0.5 μm or more and less than 1 μm. When that porous layer 60 is formed on the measurement-target-fluid contact surface 41Ab with the diameter of 5000 μm, the film forming substance deposited on the measurement-target-fluid contact surface 41Ab forms the deposited film in such a state that the deposited film is divided (split) into at least 5000 to 10000 pieces. In the diaphragm 41A on which the deposited film has been formed in the above-mentioned state, it is seen by referring to FIG. 10 that the deformation amount in the central region of the flat plate is substantially zero. Thus, according to this embodiment, the influence upon the diaphragm (deformation of the diaphragm) caused by the internal stress in the deposited film can be suppressed to a negligible level.

Furthermore, as described above, the thickness of the porous layer 60 is several ten μm. Therefore, the holes formed to extend from the surface to the deep layer portion are provided as small thin holes with the opening width being smaller than the depth. In the film division structure constituted by those thin holes, a level difference between an upper surface and a bottom surface increases, whereby the film can be effectively kept from being continuously formed.

Moreover, the holes formed in the porous layer 60 are arranged at the above-mentioned intervals in the front-rear direction in FIGS. 1 and 2 as well. Accordingly, the deposited film is further divided (split) in the front-rear direction. In this embodiment, therefore, the division (splitting) of the deposited film is promoted in comparison with the three-dimensional model 1 in which the slits 2b are formed, and the influence upon the diaphragm (deformation of the diaphragm) caused by the internal stress in the deposited film can be more satisfactorily suppressed.

In addition, this embodiment is desirable in that the above-described excellent advantageous effect can be obtained with the diaphragm including the porous layer 60 that is formed in accordance with a simple method of carrying out the procedures illustrated in FIG. 4.

Modifications

While, in the above-described embodiment, the film division structure is formed by the holes in the porous layer, the present disclosure is not limited to that case. For example, recesses may be formed directly in the diaphragm 41A instead of forming the holes in the porous layer. Those recesses are arranged in a certain direction at the intervals (namely, at the intervals of 10 μm or less in the embodiment) of 1/500 or less of the maximum length of the region in contact with the measurement target fluid, which is the diameter of the measurement-target-fluid contact surface 41Ab (namely, the diameter of 5000 μm in the embodiment). The shape of the recesses is not limited to a particular one and the recess shape in a vertical cross-section may be, for example, polygonal such as triangular or rectangular, or may be defined by a curved line such as a semicircle. Instead, the recesses may be grooves extending linearly or curvilinearly, or dents of a cylindrical or truncated conical shape.

Second Embodiment

A pressure sensor (sensor chip 13B) according to a second embodiment of the present disclosure and a capacitive diaphragm vacuum gauge 11B including the sensor chip 13B will be described below with reference to FIGS. 6 and 7. The second embodiment has been conceived as a result of considering a more preferable form in eliminating the influence upon the diaphragm (deformation of the diaphragm), which is caused by the deposited film formed on the diaphragm, (namely, a form capable of more satisfactorily dividing the deposited film), by using the film division structure.

The pressure sensor (sensor chip 13B) and the capacitive diaphragm vacuum gauge 11B including the sensor chip 13B are different from the pressure sensor (sensor chip 13A) according to the above-described first embodiment of the present disclosure and the capacitive diaphragm vacuum gauge 11A including the sensor chip 13A in that the diaphragm 41A is replaced with a diaphragm 41B (see FIG. 6). Other points are the same as those in the pressure sensor (sensor chip 13A) and the capacitive diaphragm vacuum gauge 11A including the sensor chip 13A. A structure of the diaphragm 41B will be described below. The capacitive diaphragm vacuum gauge 11B is illustrated in FIG. 1 in common with the capacitive diaphragm vacuum gauge 11A.

Diaphragm 41B

Figure 7:
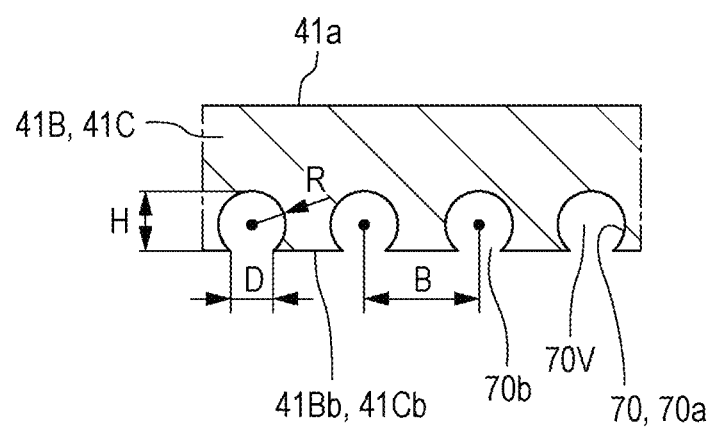
FIG. 7 is an enlarged sectional view of a portion VII in FIG. 6.

As illustrated in FIGS. 6 and 7, the diaphragm 41B is featured in that multiple recesses 70 are formed in a measurement-target-fluid contact surface 41Bb. The recesses 70 are each formed as a linear groove and has an inner space 70V defined by a wall surface 70a that is, for example, part of a substantially cylindrical surface with a radius R.

The recesses 70 are formed by, for example, isotropic etching. In an example, the recesses 70 are formed by isotropic atomic layer etching with the aid of a mask including linear slot-like openings that are formed at predetermined intervals B. With such a forming method, because the etching proceeds toward all directions from the mask openings at an equal rate, the wall surface 70a with the substantially cylindrical surface (more specifically, part of the substantially cylindrical surface) is formed. Furthermore, because the diaphragm 41B is undercut in portions under the mask openings, an opening width D of an opening 70b of each recess 70 is formed to be smaller than a maximum width (twice the radius R) of the inner space 70V. When a center axis of the wall surface 70a formed as the substantially cylindrical surface is positioned on an inner side of the diaphragm 41B relative to the opening 70b, a depth H of each recess 70 is formed to be larger than the opening width D of the opening 70b (a recess shape formed as described above is called an "undercut structure" hereinafter).

Advantageous Effects

In the sensor chip 13B including the diaphragm 41B of the above-described structure, the film forming substance contained in the measurement target fluid is deposited between the adjacent recesses 70. In other words, the multiple recesses 70 formed over the entirety of the measurement-target-fluid contact surface 41Bb constitute the film division structure. As described above, each of the recesses 70 has the structure in which the opening width of the opening 70b of the recess 70 is formed to be smaller than the maximum width (twice the radius R) of the inner space 70V, namely the so-called undercut structure. Since a peripheral edge of the opening is formed with an acute angle in the undercut structure, the action of dividing the deposited film is increased. As a result, this embodiment can provide the satisfactory effect of suppressing the influence upon the diaphragm (deformation of the diaphragm) caused by the internal stress in the deposited film.

Furthermore, this embodiment is desirable in that the above-described advantageous effect is obtained with the undercut structure which can easily be formed by the isotropic etching.

Modifications

While, in the above-described second embodiment, the recesses 70 are formed as the linear grooves, the present disclosure is not limited to that case. In other words, the form of the recesses 70 is just required to be able to divide (split) the deposited film. For example, the recesses 70 may be formed as curved grooves or holes.

The recesses 70 in the shape of holes are formed by, for example, the isotropic atomic layer etching with the aid of a mask including apertures formed in a dot pattern. In this case, the wall surface 70a is formed as a substantially spherical surface. A specific arrangement of the multiple recesses 70 formed as the holes is not limited to a particular one insofar as the deposited film 3 is divided (split) by the recesses 70. For example, when viewed in plan, centers of the recesses 70 may be regularly arranged to lie on linear lines in both the left-right direction and the front-rear direction. In another example, the recess centers may be arranged to lie on linear lines in either one of the left-right direction and the front-rear direction. In still another example, the recess centers may be arranged without regularity.

When the recesses 70 are holes, the holes are formed at the above-mentioned intervals in the front-rear direction in FIGS. 1 and 6 as well (namely, the holes are formed at the above-mentioned intervals along multiple directions). Accordingly, the deposited film is divided (split) in the multiple directions. As a result, the division (splitting) of the deposited film is promoted and the influence upon the diaphragm (deformation of the diaphragm) caused by the internal stress in the deposited film can be more satisfactorily suppressed.

Third Embodiment

A pressure sensor (sensor chip 13C) according to a third embodiment of the present disclosure and a capacitive diaphragm vacuum gauge 11C including the sensor chip 13C will be described below. In the pressure sensor (sensor chip 13C) according to the third embodiment, the feature having been clarified from the result of the "verification as to the film division structure" described in the first embodiment, more specifically the feature that, in order to reduce the deformation amount to 5% or less of the uniform film, the slits dividing (splitting) the deposited film need to be formed at intervals of 1/500 or less of the length specifying the maximum length of the region in contact with the measurement target fluid, is applied to the pressure sensor (the sensor chip 13B) according to the second embodiment, more specifically to the diaphragm 41B included in the sensor chip 13B. Therefore, a basic structure of the pressure sensor (sensor chip 13C) and the capacitive diaphragm vacuum gauge 11C including the sensor chip 13C is the same as that of the pressure sensor (sensor chip 13B) according to the second embodiment and the capacitive diaphragm vacuum gauge 11B including the sensor chip 13B. The sensor chip 13C is illustrated in FIGS. 6 and 7 in common with the sensor chip 13B, and the capacitive diaphragm vacuum gauge 11C is illustrated in FIG. 1 in common with the capacitive diaphragm vacuum gauge 11A.

As in the diaphragm 41B, the recesses 70 are formed in a diaphragm 41C included in the sensor chip 13C, more specifically in a measurement-target-fluid contact surface 41Cb of the diaphragm 41C. An interval B between the adjacent recesses 70 is set to 1/500 or less of the diameter of the measurement-target-fluid contact surface 41Cb specifying the maximum length of the region in contact with the measurement target fluid. For example, when the diameter of the measurement-target-fluid contact surface 41Cb is 5000 μm, the interval B is set to 1/500 of 5000 μm, namely 10 μm. Thus, the multiple recesses 70 are arranged at the intervals of 10 μm in the left-right direction, for example, in FIGS. 1 and 6.

Advantageous Effects

According to the sensor chip 13C including the diaphragm 41C of the above-described structure, the film forming substance deposited on the measurement-target-fluid contact surface 41Cb forms the deposited film in a state divided (split) into 500 pieces. In the diaphragm 41C on which the deposited film has been deposited in such a state, the deformation amount in a central region of the diaphragm 41C is less than 5% of the uniform film (see FIG. 10). Thus, according to this embodiment, the influence upon the diaphragm (deformation of the diaphragm) caused by the internal stress in the deposited film can be satisfactorily suppressed with combination of the effect resulting from the division of the deposited film into the desired number and the effect resulting from the undercut structure. In addition, this embodiment is desirable in that the above-described advantageous effect is obtained with the undercut structure which can easily be realized with the isotropic etching.

Modifications

While, in the third embodiment, the recesses 70 are formed as the linear grooves, the present disclosure is not limited to that case as in the above-described second embodiment insofar as the recesses 70 are able to divide (split) the deposited film. For example, the recesses 70 may be formed as curved grooves or holes. The recesses 70 in the shape of holes are formed by, for example, the isotropic atomic layer etching with the aid of a mask including apertures formed in a dot pattern. In this case, the wall surface 70a is formed as a substantially spherical surface. An interval between the adjacent recesses 70, namely an interval between center points of the wall surfaces 70a (the interval in each of the left-right direction and the front-rear direction in FIGS. 1 and 6), is set to 1/500 or less of the maximum length of the region in contact with the measurement target fluid, namely the diameter of the measurement-target-fluid contact surface 41Bb (for example, when the diameter of the measurement-target-fluid contact surface 41Bb is 5000 μm, the above-mentioned interval is set to 10 μm).

When the recesses 70 are holes, the holes are formed at the above-mentioned intervals in the front-rear direction in FIGS. 1 and 6 as well (namely, the recesses 70 are arranged at the above-mentioned intervals along multiple directions). Accordingly, the deposited film is divided (split) in the multiple directions. As a result, the division (splitting) of the deposited film is promoted and the influence upon the diaphragm (deformation of the diaphragm) caused by the internal stress in the deposited film can be more satisfactorily suppressed.

While the embodiments of the present disclosure have been described above, the present disclosure is not limited to those embodiments and can be variously modified within the scope not departing from the gist of the present disclosure. Even components or structures not explicitly described and illustrated in the specification and the drawings also fall within the scope of the technical concept of the present disclosure insofar as those components or structures provide and ensure the operations and the advantageous effects specific to the present disclosure. Moreover, the individual features of the embodiments described above and illustrated in the drawings can be combined with each other and can be combined with the existing techniques insofar as there are no contradictions in objects, structures, and so on.

For example, while the capacitive sensor chip utilizing a pressure detection method (sensing principle) based on deformation of a diaphragm is used in the above-described embodiments, the present disclosure is not limited to that case and may be applied to another pressure detection method (sensing principle) of the type using, for example, a semiconductor strain gauge, a metal strain gauge, or a resistance gauge each of which is constituted with a film formed by sputtering, for example.

What is claimed is:

1. A pressure sensor, comprising:
a diaphragm that has a thin plate shape and that forms part of a wall surface of a pressure chamber into and out from which a measurement target fluid flows,
wherein multiple recesses are formed in the diaphragm on a side in contact with the measurement target fluid,
an interval between adjacent two of the multiple recesses is 10 μm or less; and
the diaphragm is coated with a porous layer including holes that constitute the recesses and that are formed on the side in contact with the measurement target fluid, and a diameter of the holes is 10 μm or less.

2. The pressure sensor according to claim 1, wherein the porous layer is made of sapphire or α-phase aluminum oxide.

3. A capacitive diaphragm vacuum gauge including the pressure sensor according to claim 1.

4. A pressure sensor, comprising:
a diaphragm that has a thin plate shape and that forms part of a wall surface of a pressure chamber into and out from which a measurement target fluid flows,
wherein multiple recesses are formed in the diaphragm on a side in contact with the measurement target fluid,
an interval between adjacent two of the multiple recesses is 10 μm or less, and
the recesses are each formed such that a width of an opening formed on the side in contact with the measurement target fluid is smaller than a maximum width of an inner space.

5. The pressure sensor according to claim 4, wherein the recesses are each a linear groove defined by a substantially cylindrical wall surface.

6. The pressure sensor according to claim 4, wherein the recesses are each a hole defined by a substantially spherical wall surface.

7. The pressure sensor according to claim 4, wherein the opening width of the recesses is smaller than a depth of the recesses.

8. A capacitive diaphragm vacuum gauge including the pressure sensor according to claim 4.

* * * * *